United States Patent Office 3,476,514
Patented Nov. 4, 1969

3,476,514
CANCER CYTOSCREENING
Daniel Roth, 8 Glenwood Lane,
Roslyn Heights, N.Y. 11577
No Drawing. Filed Sept. 9, 1966, Ser. No. 578,162
Int. Cl. G01n 31/22, 33/16, 21/52
U.S. Cl. 23—230                            6 Claims

ABSTRACT OF THE DISCLOSURE

A method of detecting cancerous body cells by observing the change in fluorescence of a buffered quantity of a diluted standard acriflavine hydrochloride solution after the buffered solution has been allowed to stain a fixed number of cells obtained by known techniques of self-irrigation or swabbing. The solution is separated from the cells and its fluorescence instrumentally determined and compared to the fluorescence of an identical quantity of a control buffer solution. The difference in fluorescence is correlated to the presence or absence of malignant cells.

---

This invention relates to a process for use in cancer detection and more particularly to a technique involving automated cancer cytoscreening.

The present invention has for an object the provision of a technique for pre-screening the oral cavity for cancer by analyzing the loss in fluorescence of standardized dilute solutions of acriflavine hydrochloride after staining cells obtained by self-irrigation or by swabbing. The invention allows extremely sensitive determinations with relatively simple apparatus. Early clinical results obtained to date indicate sharp quantitative differences, ascribed to variations in cellular nucleic acid content, between normal cells, cells of heavy smokers, leukoplakia, and malignancies. These quantitative automated data can be correlated with conventional cytological preparations made simultaneously from the same cells, as an additional corroborative check.

There is a clear need for lightening the workload of the cytologist in view of the steadily increasing use of exfoliative cytology in cancer detection and the shortage of competent cytotechnologists. It is therefore a basic object of the invention to provide a technique for cancer detection that is designed to reduce the number of specimens which must be screened manually, by pre-screening them automatically, and simultaneously making conventional cytological preparations for critical appraisal by the human eye when required.

The technique makes use of the high affinity of the diaminoacridine dye, acriflavine hydrochloride, for nucleic acids, and of its high quantum efficiency of fluorescence, which permits measurements of extremely low concentrations of dye solution by fluorometry. The intensity of fluorescence of dye solution is in linear proportion to its concentration in the range of 0.001 to 1 microgram per ml. The free dye remaining in an aliquot of dye solution after known numbers of cells have been stained, is analyzed, thus minimizing light scatter, internal filter effects, and distributional error, all of which seriously reduce sensitivity in the direct microspectrofluorometry of cell-bound fluorochromes, as performed in other fluorescent cytodiagnostic procedures.

Still further objects and features of this invention reside in a process for cancer cytoscreening that permits for high speed detection of cancer, uses simple apparatus, is convenient for patients and their doctors and allows for absolute quantitation against dye standards to be gained.

These, together with the various ancillary objects and features of the invention, which will become apparent from the following specification, are attained by this novel technique of cancer cytoscreening.

In carrying out the invention experimental cells, such as HeLa cells and Ehrlich-Lettré ascites tumor cells are used, either fresh, or frozen. Squamous cells were obtained by swabbing the mucous membrane of the human oral cavity with a cotton-tipped applicator 3 or 4 times, and swirling the tip each time in a tube containing about 5 ml. of normal saline. Samples can also be self-harvested by irrigating the mouth for 30 seconds with about 20 ml. of normal saline after a preliminary cleansing rinse with water. Cell suspensions thus obtained remain usable for about 3 days at room temperature, and longer when refrigerated. Replicable measurements are obtained under these conditions, and obviate the need for fixation, which interferes in one way or the other by altering either nucleoprotein structure, or the binding of acridines to intracellular polymers.

The cells thus obtained are evenly resuspended by a mechanical mixer, such as a Vortex mixer and then counted, generally by hemacytometer. An electronic counter, such as a Coulter Counter can be used to advantage.

Working within limitations imposed by the maximal sensitivity of the fluorometer, the numbers of cells obtainable by simple swabbing or irrigation, and the need to maintain a fairly constant ratio of about 100:1 between the concentration of nucleic acid and dye, it was determined that human squamous cells numbering 50,000, HeLa cells numbering 20,000, and ascites cells numbering 10,000, provided the optimal uptake of dye for analytical purposes from aliquots containing about 0.022 microgram of acriflavine hydrochloride per ml. In accordance with the foregoing, sufficient volumes of cell suspensions are taken and are counted to furnish these optimal cell numbers. By using constant numbers of cells in all samples, one of the two variables in the final calculations is eliminated, thereby permitting direct reading of recorded fluorescence percentages. The measured samples are then sedimented or filtered to dryness, for example by centrifugation at 4500 r.p.m. or filtration through 25 mm. Teflon membrane filters with 10 micron porosity (Millipore Mitex-LC), set in specifically designed centrifuge tubes (IEC "Filterfuge" tubes). Gelman VM-100 polyvinyl filters also are satisfactory. Practically all bacteria, leukocytes, and fragmented squamous cells are thereby eliminated. Cellular sediment or, if filtration is used, the membrane filters are washed twice in-situ with phosphate buffer (pH 6) and then, without removing from the centrifuge tubes or the centrifuge, are overlaid with exactly 10 ml. of acriflavine hydrochloride (Matheson) freshly diluted 1000 times in phosphate buffer from a stock solution of 10 mg. of dye in 450 ml. of doubly distilled water kept in amber bottles. The final concentration, about 0.022 microgram per ml., is quite sensitive to light, and at all steps in the procedure, direct light is avoided and red illumination used, and the centrifuge lid is kept closed as much as possible. The samples are stained for about 20 minutes with occasional gentle agitation, (the hydrophobic qualities of the Teflon filters preventing seepage) then centrifuged to dryness at 3000 r.p.m., and the filtrates or sediment collected in plastic centrifuge tubes and then decanted into 12 mm. Pyrex test tubes for fluorescence analysis.

The fluorometer used may be a Turner model 110, modified for increased sensitivity with a high intensity mercury lamp, high sensitivity cuvet-holder conversion, and fitted with a Corning narrow band pass filter of 436 m$\mu$ over the exciting light and one of 515 m$\mu$ over the emitted light. Measurements are recorded on a continuous linear recorder whose 100% limit is standardized against the same dilute dye as was prepared for staining samples, and whose zero baseline is set against the sample cuvet filled with buffer. Thus the autofluorescence of the dilution liquid, amounting to about 4%, is cancelled out. Fuorescence due to the walls of the glass cuvet is a minimal factor in the Turner fluorometer, and this is further reduced by using the same cuvet for all readings. A quick rinse with 80% alcohol, followed by a rinse with distilled water prepares the cuvet for the succeeding determination.

The recorded fluorescence is either read as percent, when cell numbers are constant, or as micrograms of dye per cell by dividing the cell count into the total amount of dye taken up. Since the resulting figures are in the order of $10^{-6}$ microgram, they were reported in picograms ($10^{-12}$ gm.).

The collected cells are saved after staining, and may be processed by conventional Papanicolaou technique either unfixed or after fixing in alcohol-ether for checking of results. The concentration of acriflavine is so low as to produce no visible interfering staining of cells, and when Teflon filters are used they, being chemically inert, require no decolorizing or other special clearing steps. The collected cells are found to be spread evenly. Excellent cytological preparations can thus be obtained, free from the usual obscuring effects of leukocytes, erythroctes, debris, and bacteria. It is to be noted that bacteria which are often observed in sizable numbers in the cytoplasm of oral and vaginal squamous cells in conventional smears, are almost completely eliminated. The cytologist thus is provided with exactly the same cells as had been used for the automated portion of the screening procedure in accordance with the invention. These preparations can then be used for correlation with the fluorescence determinations, and clinically, to check all automated readings in the suspicious range.

Replicability is excellent, both on repeated analysis of the same specimen and on successive swabbings from the same individual. Admixtures of up to one malignant (HeLa) cell per 12 normal squamous cells were readily detected by the technique of the present invention.

Samples of experimental cells, such as HeLa cells, ascites cells, normal buccal cells, and normal cells from the dorsum of the tongue are initially analyzed, then incubated with ribonuclease and desoxyribonuclease in the presence of magnesium, in order to assess the specificity of the dye for cellular nucleic acids. After incubation with both enzymes simultaneously, dye uptake is completely inhibited in all samples except for a residual uptake amounting to 7% of the pre-hydrolysis adsorption in the case of the ascites cells. It had been anticipated that keratinized cells from the tongue might also bind dye non-specifically, but this was not found to be the case under the staining conditions used in the present invention.

The table represents a tabulation of a clinical study, in which measurements were taken on swabbings from the oral mucosa of humans divided according to 5 categories: non-smokers; light smokers, heavy smokers, leukoplakic areas in cases with cancer elsewhere in the upper respiratory tract, and frankly malignant lesions. In the two categories with specific lesions the swabbings were taken directly from the lesions. Where more than one result is listed for a case, this represents repetitions on different samples from that individual obtained at various times. Those results designated "rinsed," represent specimens self-harvested by the rinsing technique, for comparison with the swabbing technique. Results are tabulated in terms of picograms per cell.

TABLE

| Non-Smokers | Smokers Less than 1½ Packages per day | Smokers More than 1½ Packages per day | Leuko- plakia | Cancer |
|---|---|---|---|---|
| 1.4 | 1.9 | 2.4 (Rinsed 2.3) | 5.6 | 3.5, 3.8 |
| 1.5 (Rinsed 1.5) | 1.5 (Rinsed 1.6) | 3.0 | 7.7 | 5 |
| 1.4 | | 2.3 | *16.0 | *13 |
| 1.7 | 1.7 | 2.7 | 3.4 | 8 |
| 1.6 | 1.7 | 2.1 | | 7 |
| 1.5 | | 2.0 | | 2.4 |
| | | 2.5 | | |
| 1.6 | | 2.2 | | |
| 1.4 | | 2.2 | | 4 |
| 1.4 | | 2.5 | | |
| 1.6 | | 2.3 | | |
| 1.7 | | 2.2 | | |
| 1.5 | | 2.1 | | |
| 1.1, 1.3, 1.2 | | 2 (Pipe) | | |
| 0.94 (Rinsed 1) | | 2.3 (Pipe) | | |
| 1.5, 1.3, 1.2, 1.2 | | | | |
| 1.4 (Rinsed 1.4) | | | | |

Average dye bound per cell (in picograms) in 5 human categories. Replicate analysis on some individuals are listed, as well as analysis on irrigated samples ("rinsed"). All others obtained by swabbing. The results marked by an asterisk were obtained in a patient recently treated with irradiation.

The present invention especially oriented about the problem of detecting early oral cancer specifically. The unique histopathology of oral cancer makes it less susceptible to detection by existing cytomorphological criteria alone. The fact that "field" alterations of large areas of the oral mucosa in carcinogenesis has been established, the technique of the present enables the present invention to be capable of detecting the abnormal case, even when frank, recognizable cancer cells were in the minority of exfoliated cells. Moreover, this approach, permitting self-harvesting of cells, has epidemiological pertinence with specific regard ot the oral cavity, insofar as the very group of patients with the highest incidence of oral cancer is the group least likely to come to a physician or dentist for examination and smear-taking. Simplifying the harvesting technique should enhance its acceptance by these patients. In corollary with this, while a competent pelvic examination should always be performed in conjunction with smear-taking in the female generative tract, in order to discover disease of the uterus, adnexa, and rectum, there is relatively little life-threatening disease in the oral cavity other than cancer with which the clinician need concern himself. Thus, the recalcitrant patient will still be well served if he should choose to avoid a professional visit and content himself with a mouth irrigation at regular intervals.

Increments among the smokers with no lesions may of course be non-specific and reversible, but may on the other hand be manifestations of true metabolic alterations in epithelial cells exposed to tobacco smoke such as have been described by C. Leuchtenberger, R. Leuchtenberger, and Doolin, P. F. Cancer, 11:490–506, 1958.

It is permissible to speculate that slight metabolic changes, detectable by a highly sensitive analytical technique such as this, may emerge as early heralds of specific progressive injury caused by smoking. It will be of interest to observe whether these will be reversible after periods of abstinence from smoking.

A latitude of modification, change and substitution is intended in the foregoing disclosure and in some instances some features of the invention will be employed without a corresponding use of other features.

I claim:

1. A method of cancer detection comprising the steps of obtaining cells, mechanically mixing said cells in a saline solution until said cells are substantially evenly suspended therein, measuring the total number of said cells and dividing said total number of said cells in said solution into cell samples of a predetermined number, separating substantially all bacteria, leukocytes, and fragmented squamous cells as a suspension in said saline solution medium from said cell samples until said cell samples become dry, staining said cell samples with a portion of a buffered solution of acriflavine hydrochloride at a known concentration while at the same time illuminating said samples with red light, separating from said cell samples the buffered solution of acriflavine hydrochloride which has not been absorbed by said cell samples and collecting said solution, measuring the fluorescence of the collected portions of said buffered solution of acriflavine hydrochloride and subtracting from said fluorescence the autofluorescence of a control buffer solution and relating the net fluorescence to the presence of cancerous cells in said cell samples by determining the amount of dye absorbed by said cell samples in proportion to the total numbers of cells in said cell samples.

2. A method of cancer detection according to claim 1, wherein said acriflavine hydrochloride is diluted in a phosphate buffer to a concentration on the order of 0.022 microgram per ml.

3. A method of cancer detection according to claim 1, wherein said cell samples are separated from said saline solution medium by filtration to dryness through membrane filters having a porosity on the order of 10 microns.

4. A method of cancer detection according to claim 1, wherein said cell samples are separated from said saline solution medium by centrifugation to dryness at approximately 4500 r.p.m.

5. A method of cancer detection according to claim 1, wherein the cells are obtained by swabbing the mucous membrane of the human oral cavity with applicator and then swirling said applicator in a vessel containing about 5 ml. of physiological normal saline therein.

6. A method of cancer detection according to claim 1, wherein said cells are obtained by self-harvesting through irrigating the human mouth for a period of time on the order of thirty seconds with about 20 ml. of physiological normal saline.

References Cited

Black, M. M.: Review Gastroenterology, 1950, pp. 481–487.

Bartalanffy et al.: Science, 124, 1024–5, Nov. 23, 1956.

Pfeiffer, H. H.: Chem. Abstr., 56, 5239$b$, March 1962.

MORRIS O. WOLK, Primary Examiner

R. M. REESE, Assistant Examiner

U.S. Cl. X.R.

424—7